US012700275B2

(12) United States Patent
Liu et al.

(10) Patent No.: US 12,700,275 B2
(45) Date of Patent: Aug. 4, 2026

(54) VEHICLE UNLOCKING METHOD, SYSTEM, AND APPARATUS, VEHICLE, AND STORAGE MEDIUM

(71) Applicant: YINWANG INTELLIGENT TECHNOLOGIES CO., LTD., Shenzhen (CN)

(72) Inventors: Chengming Liu, Shanghai (CN); Weiran Nie, Shanghai (CN); Junhao Zhang, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 17/893,869

(22) Filed: Aug. 23, 2022

(65) Prior Publication Data

US 2022/0402459 A1    Dec. 22, 2022

Related U.S. Application Data

(63) Continuation of application No. PCT/CN2020/077342, filed on Feb. 29, 2020.

(51) Int. Cl.
    *G07C 9/00*     (2020.01)
    *B60R 25/25*     (2013.01)
    (Continued)

(52) U.S. Cl.
    CPC ........ *G07C 9/00563* (2013.01); *B60R 25/257* (2013.01); *B60R 25/305* (2013.01); *G06V 40/168* (2022.01); *G06V 40/25* (2022.01)

(58) Field of Classification Search
    CPC ...... G06V 40/168; G06V 40/16; G06V 40/25; G07C 9/37; G07C 9/00563;
    (Continued)

(56) References Cited

U.S. PATENT DOCUMENTS 10,504,515 B2 * 12/2019 Chih ................... F16M 11/2014
2002/0118232 A1 * 8/2002 Watanabe ............... G06F 3/017
                                     715/863

(Continued)

FOREIGN PATENT DOCUMENTS

CN     105100635 A   11/2015
CN     105336021 A   2/2016
    (Continued)

OTHER PUBLICATIONS

Office Action in Chinese Appln. No. 202080006720.2, dated Dec. 15, 2021, 19 pages (with English translation).

(Continued)

*Primary Examiner* — Yong Hang Jiang
(74) *Attorney, Agent, or Firm* — Fish & Richardson P.C.

(57) ABSTRACT

Example vehicle unlocking methods and apparatus are described. In one example method, wakeup keyword detection is performed on an obtained voice signal. If the voice signal includes a wakeup keyword, an acoustic source direction is determined, and a target camera is indicated to collect image data. The target camera is a target camera that is installed on the vehicle and whose angle of view can ensure that the acoustic source direction is captured. Then, the vehicle is unlocked based on the image data collected by the target camera.

20 Claims, 5 Drawing Sheets

(51) Int. Cl.
    *B60R 25/30*         (2013.01)
    *G06V 40/16*         (2022.01)
    *G06V 40/20*         (2022.01)

(58) Field of Classification Search
    CPC .......... G07C 2009/00801; B60R 25/25; B60R
                                     25/305; B60R 25/257
    See application file for complete search history.

(56)               References Cited

U.S. PATENT DOCUMENTS

| | | | |
|---|---|---|---|
| 2002/0152010 A1 | 10/2002 | Colmenarez et al. | |
| 2003/0125945 A1* | 7/2003 | Doyle | G10L 15/01 704/E15.002 |
| 2004/0252013 A1 | 12/2004 | Fuks et al. | |
| 2008/0154613 A1* | 6/2008 | Haulick | B60R 25/257 704/275 |
| 2014/0334682 A1* | 11/2014 | Lee | G06V 10/454 704/250 |
| 2015/0245133 A1* | 8/2015 | Kim | H04N 7/147 381/92 |
| 2016/0300410 A1 | 10/2016 | Jones et al. | |
| 2019/0318159 A1 | 10/2019 | Blanc-Paques et al. | |
| 2020/0027461 A1 | 1/2020 | Grgac | |
| 2020/0135190 A1* | 4/2020 | Kaja | G06V 40/172 |
| 2020/0207308 A1* | 7/2020 | Boulton | B60R 25/241 |

FOREIGN PATENT DOCUMENTS

| | | | |
|---|---|---|---|
| CN | 105338292 A | | 2/2016 |
| CN | 106427869 A | | 2/2017 |
| CN | 107089214 A | | 8/2017 |
| CN | 107187418 A | | 9/2017 |
| CN | 107358085 A | | 11/2017 |
| CN | 107800967 A | | 3/2018 |
| CN | 207644341 U | | 7/2018 |
| CN | 106143412 B | | 9/2018 |
| CN | 208207948 U | * | 12/2018 |
| CN | 110009780 A | | 7/2019 |
| GB | 2447660 A | | 9/2008 |

OTHER PUBLICATIONS

Office Action in Chinese Appln. No. 202080006720.2, dated Mar. 9, 2022, 19 pages (with English translation).

Extended European Search Report in European Appln No. 20921243. 0, dated Dec. 23, 2022, 7 pages.

International Search Report and Written Opinion in International Appln. No. PCT/CN2020/077342, mailed on Dec. 3, 2020, 16 pages (with English translation).

* cited by examiner

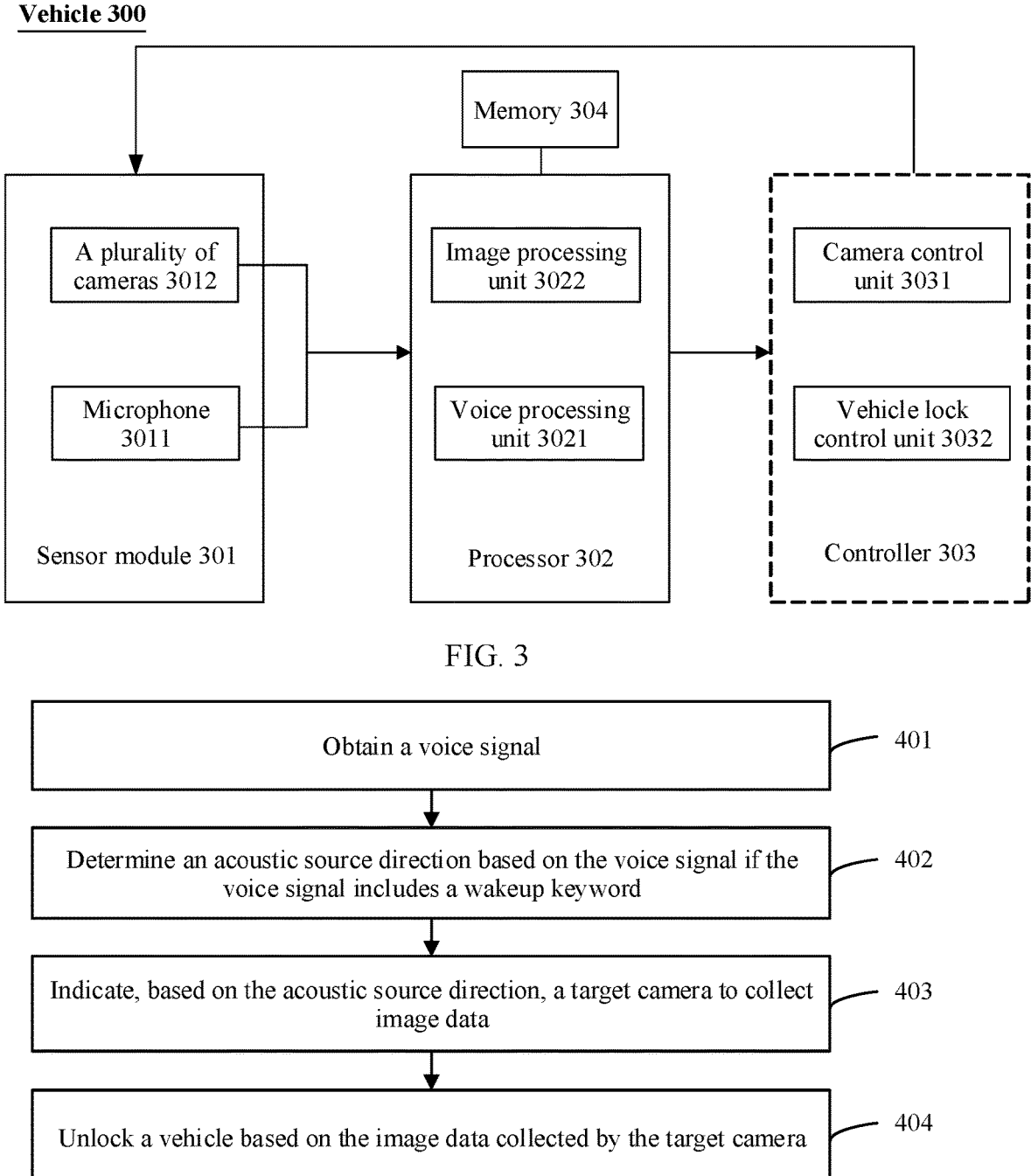

Vehicle 300

Memory 304

A plurality of cameras 3012

Microphone 3011

Sensor module 301

Image processing unit 3022

Voice processing unit 3021

Processor 302

Camera control unit 3031

Vehicle lock control unit 3032

Controller 303

FIG. 3

Obtain a voice signal — 401

Determine an acoustic source direction based on the voice signal if the voice signal includes a wakeup keyword — 402

Indicate, based on the acoustic source direction, a target camera to collect image data — 403

Unlock a vehicle based on the image data collected by the target camera — 404

FIG. 4

VEHICLE UNLOCKING METHOD, SYSTEM, AND APPARATUS, VEHICLE, AND STORAGE MEDIUM

CROSS-REFERENCE TO RELATED APPLICATIONS

This application is a continuation of International Application No. PCT/CN2020/077342, filed on Feb. 29, 2020, the disclosure of which is hereby incorporated by reference in its entirety.

TECHNICAL FIELD

This application relates to the field of vehicle technologies, and in particular, to a vehicle unlocking method, system, and apparatus, a vehicle, and a storage medium.

BACKGROUND

Currently, vehicles have become a main transport tool for people to travel, and people may unlock the vehicles by using car keys, to implement a transport function and the like of the vehicles. However, a vehicle cannot be unlocked when a car key is not present or the car key is locked inside the vehicle. Currently, in addition to the car key, the vehicle may be unlocked by connecting an intelligent terminal to an in-vehicle infotainment. For example, a mobile phone is connected to the in-vehicle infotainment to replace the car key, to unlock the vehicle. Similarly, if the mobile phone is not present, or if the mobile phone is also locked inside the vehicle, the vehicle cannot be unlocked, either. Therefore, there is an urgent need for a key-free vehicle unlocking method, in other words, no physical key is used.

In a related technology, a user may enter a password into a coded lock disposed outside a vehicle body, to unlock a vehicle without a key. However, in an unlocking process using a password, the user needs to manually enter a password after reaching a position of the coded lock, entire unlocking duration is relatively long, and security of unlocking using a password is relatively low.

SUMMARY

This application provides a vehicle unlocking method, system, and apparatus, a vehicle, and a storage medium, to improve a speed and security of a key-free vehicle unlocking method. The technical solutions are as follows:

According to a first aspect, a vehicle unlocking method is provided, where the method may be applied to an in-vehicle infotainment included in a vehicle, and the method includes: obtaining a voice signal; determining an acoustic source direction based on the voice signal if the voice signal includes a wakeup keyword, where the wakeup keyword is used to indicate that a vehicle currently needs to be unlocked; indicating, based on the acoustic source direction, a target camera to collect image data, where the target camera is a camera that is installed on the vehicle and whose angle of view can ensure that the acoustic source direction is captured; and unlocking the vehicle based on the image data collected by the target camera.

In this application, a microphone is installed on the vehicle, and the microphone may collect a voice signal in an environment, and transmit the collected voice signal to the in-vehicle infotainment.

It should be noted that the microphone is a low power consumption apparatus. Therefore, the microphone may be in a working state at all times, to collect the voice signal in the environment in real time.

In this application, after the voice signal is obtained, wakeup keyword detection may be performed on the voice signal, where the wakeup keyword is used to indicate that the vehicle currently needs to be unlocked. If it is detected that the voice signal includes the wakeup keyword, it may be determined that the wakeup keyword detection succeeds.

Optionally, in this application, to further improve security, after the wakeup keyword detection is performed on the obtained voice signal, voiceprint feature matching may be further performed, and after the voiceprint feature matching succeeds, the acoustic source direction is determined. To be specific, the determining an acoustic source direction based on the voice signal if the voice signal includes a wakeup keyword includes: if the voice signal includes the wakeup keyword, extracting a voiceprint feature in the voice signal; and if the extracted voiceprint feature matches any stored voiceprint feature, determining the acoustic source direction based on the voice signal.

Optionally, the indicating, based on the acoustic source direction, a target camera to collect image data includes: selecting, based on the acoustic source direction and from a plurality of cameras installed on the vehicle, a camera whose angle of view can ensure that the acoustic source direction is captured, and determining the selected camera as the target camera; and indicating, based on the acoustic source direction, the target camera to collect the image data.

In this application, after determining the acoustic source direction, the in-vehicle infotainment may control the target camera to be turned on to collect the image data. The target camera is a camera that is installed on the vehicle and whose angle of view can ensure that the acoustic source direction is captured.

In a possible case, the plurality of cameras are installed on the vehicle. The in-vehicle infotainment may select, based on the acoustic source direction and from the plurality of cameras installed on the vehicle, the camera whose angle of view can ensure that the acoustic source direction is captured, determine the selected camera as the target camera, and indicate, based on the acoustic source direction, the target camera to collect the image data.

Optionally, after determining the target camera, the in-vehicle infotainment may further control the target camera to rotate to adjust an angle, so that a middle position of the angle of view of the target camera overlaps the acoustic source direction, and the target camera captures a complete figure image as far as possible.

In some other possible cases, only one camera may be installed on the vehicle, and the camera may be installed at a middle position outside a roof of the vehicle. In this way, the camera is the target camera. After determining the acoustic source direction, the in-vehicle infotainment may control the target camera to rotate to adjust an angle, so that the angle of view of the target camera can ensure that the acoustic source direction is captured. For example, the middle position of the angle of view of the target camera may be enabled to overlap the acoustic source direction, and then the in-vehicle infotainment may indicate the target camera to collect the image data.

After the target camera is turned on to collect the image data, the target camera may send the collected image data to the in-vehicle infotainment, and the in-vehicle infotainment may process the received image data, to further determine whether to unlock the vehicle.

Optionally, the unlocking the vehicle based on the image data collected by the target camera includes: matching the image data collected by the target camera with stored figure image data; and unlocking the vehicle if the image data collected by the target camera matches the stored figure image data.

In this application, image processing may be facial recognition, gait recognition, iris recognition, or the like, and correspondingly, the figure image data stored in the in-vehicle infotainment may include a facial feature, a gait feature, an iris feature, or the like. If image data matching is performed based on facial recognition or an iris feature, the image data collected by the target camera may be an image or a video. If image data matching is performed based on a gait feature, the image data collected by the target camera may be a video. In other words, in this embodiment of this application, there may be a plurality of implementations of performing, by the in-vehicle infotainment, the image data matching. The following describes two implementations.

In a first implementation, the figure image data stored in the in-vehicle infotainment includes a facial feature, and the in-vehicle infotainment performs the image data matching based on facial recognition.

Optionally, the stored figure image data includes a facial feature; the matching the image data collected by the target camera with stored figure image data includes: extracting a facial feature of a figure recognized in the image data; and the unlocking the vehicle if the image data collected by the target camera matches the stored figure image data includes: unlocking the vehicle if the facial feature of the figure recognized in the image data matches any stored facial feature.

If image processing is performed on each region of an entire image, a relatively large amount of data needs to be processed. The acoustic source direction has been determined above, and a time interval from when the acoustic source direction is determined to when the image data is collected is very short. Based on this, after obtaining the image data collected by the target camera, the in-vehicle infotainment may alternatively extract a facial feature of a figure that is recognized in the image data and that is located in the acoustic source direction, and unlock the vehicle if the extracted facial feature matches any stored facial feature. To be specific, the in-vehicle infotainment may perform the facial recognition in a small range based on the acoustic source direction, to greatly reduce a computing amount of image processing and further increase an unlocking speed.

Optionally, the stored figure image data includes a facial feature; the matching the image data collected by the target camera with stored figure image data includes: extracting a facial feature of a figure that is recognized in the image data and that is located in the acoustic source direction; and the unlocking the vehicle if the image data collected by the target camera matches the stored figure image data includes: unlocking the vehicle if the extracted facial feature matches any stored facial feature.

Optionally, the extracting a facial feature of a figure that is recognized in the image data and that is located in the acoustic source direction includes: determining an image region from the image data based on the acoustic source direction; and extracting a facial feature of a figure recognized in the image region.

Optionally, the determining an image region from the image data based on the acoustic source direction includes: determining a relative position of the acoustic source direction in the angle of view of the target camera; determining a reference position on the image data based on the relative position; and extending the reference position on the image data to each of a left side and a right side by a reference neighborhood range, to obtain the image region.

In a second implementation, the figure image data stored in the in-vehicle infotainment includes a gait feature, and the in-vehicle infotainment performs the image data matching based on gait recognition.

It can be learned from the foregoing that the image data collected by the target camera may be a video. In this implementation, after receiving the image data collected by the target camera, the in-vehicle infotainment may extract a gait feature of a figure recognized in the video, and unlock the vehicle if the gait feature of the figure recognized in the image data matches any stored gait feature. To be specific, the image data collected by the target camera is a video, and the stored figure image data includes a gait feature; the matching the image data collected by the target camera with stored figure image data includes: extracting a gait feature of a figure recognized in the video; and the unlocking the vehicle if the image data collected by the target camera matches the stored figure image data includes: unlocking the vehicle if the gait feature of the figure recognized in the image data matches any stored gait feature.

Optionally, the image data collected by the target camera is a video, and the stored figure image data includes a gait feature; the matching the image data collected by the target camera with stored figure image data includes: extracting a facial feature of a figure recognized in the image data; determining, as a target figure, a recognized figure whose facial feature matches any stored facial feature; extracting a gait feature of the target figure recognized in the image data; and unlocking the vehicle if the gait feature of the target figure matches any stored gait feature.

In this application, if gait recognition is performed on all image data of the collected video, a relatively large amount of data needs to be processed. Therefore, the in-vehicle infotainment may perform facial recognition on the collected video, to obtain a figure matching any stored facial feature, further track the figure, and perform gait recognition only on the figure in the video. A process of performing the facial recognition on the collected image data may be: processing image data of an entire image, or processing image data in a small range based on the acoustic source direction. For a related implementation, refer to the foregoing related descriptions, and details are not described herein again.

Optionally, after the matching the image data collected by the target camera with stored figure image data, the method further includes: if the image data collected by the target camera does not match the stored figure image data, indicating the target camera to be turned off.

In this application, if the image data, for example, an image or a video, collected by the target camera does not match the stored figure image data, for example, facial recognition fails, gait recognition fails, iris recognition fails, no face is recognized, no gait is recognized, or no iris is recognized, the in-vehicle infotainment may control the camera to be turned off, to reduce power consumption.

According to a second aspect, a vehicle unlocking apparatus is provided. The vehicle unlocking apparatus has a function of implementing behavior in the vehicle unlocking method in the first aspect. The vehicle unlocking apparatus includes one or more modules, and the one or more modules are configured to implement the vehicle unlocking method provided in the first aspect.

In other words, this application provides a vehicle unlocking apparatus, applied to a vehicle, where the apparatus includes:

an obtaining module, configured to obtain a voice signal;

a determining module, configured to determine an acoustic source direction based on the voice signal if the voice signal includes a wakeup keyword, where the wakeup keyword is used to indicate that the vehicle currently needs to be unlocked;

an indication module, configured to indicate, based on the acoustic source direction, a target camera to collect image data, where the target camera is a camera that is installed on the vehicle and whose angle of view can ensure that the acoustic source direction is captured; and an unlocking module, configured to unlock the vehicle based on the image data collected by the target camera.

Optionally, the indication module includes:

a first determining unit, configured to select, based on the acoustic source direction and from a plurality of cameras installed on the vehicle, a camera whose angle of view can ensure that the acoustic source direction is captured, and determine the selected camera as the target camera; and a first indication unit, configured to indicate, based on the acoustic source direction, the target camera to collect the image data.

Optionally, the unlocking module includes:

a matching unit, configured to match the image data collected by the target camera with stored figure image data; and an unlocking unit, configured to unlock the vehicle if the image data collected by the target camera matches the stored figure image data.

Optionally, the stored figure image data includes a facial feature;

the matching unit is specifically configured to:

a first extraction subunit, configured to extract a facial feature of a figure recognized in the image data; and the unlocking unit includes:

a first unlocking subunit, configured to unlock the vehicle if the facial feature of the figure recognized in the image data matches any stored facial feature.

Optionally, the stored figure image data includes a facial feature;

the first extraction subunit is further configured to:

extract a facial feature of a figure that is recognized in the image data and that is located in the acoustic source direction; and the first unlocking subunit is further configured to:

unlock the vehicle if the extracted facial feature matches any stored facial feature.

Optionally, the first extraction subunit is specifically configured to:

determine an image region from the image data based on the acoustic source direction; and extract a facial feature of a figure recognized in the image region.

Optionally, the first extraction subunit is further specifically configured to:

determine a relative position of the acoustic source direction in the angle of view of the target camera;

determine a reference position on the image data based on the relative position; and extend the reference position on the image data to each of a left side and a right side by a reference neighborhood range, to obtain the image region.

Optionally, the image data collected by the target camera is a video, and the stored figure image data includes a gait feature;

the matching unit includes:

a second extraction subunit, configured to extract a gait feature of a figure recognized in the video; and the unlocking unit includes:

a second unlocking subunit, configured to unlock the vehicle if the gait feature of the figure recognized in the image data matches any stored gait feature.

Optionally, the image data collected by the target camera is a video, and the stored figure image data includes a gait feature;

the second extraction subunit is specifically configured to:

extract a facial feature of a figure recognized in the image data;

determine, as a target figure, a recognized figure whose facial feature matches any stored facial feature; and extract a gait feature of the target figure recognized in the image data; and the second unlocking subunit is specifically configured to:

unlock the vehicle if the gait feature of the target figure matches any stored gait feature.

Optionally, the determining module includes:

an extraction unit, configured to: if the voice signal includes the wakeup keyword, extract a voiceprint feature in the voice signal; and a second determining unit, configured to: if the extracted voiceprint feature matches any stored voiceprint feature, determine the acoustic source direction based on the voice signal.

Optionally, the unlocking module further includes:

a second indication unit, configured to indicate the target camera to be turned off if the image data collected by the target camera does not match the stored figure image data.

According to a third aspect, a vehicle unlocking system is provided, where the system includes a vehicle unlocking apparatus and at least one camera. The vehicle unlocking apparatus is configured to obtain a voice signal, and determine an acoustic source direction based on the voice signal if the voice signal includes a wakeup keyword, where the wakeup keyword is used to indicate that a vehicle currently needs to be unlocked. The vehicle unlocking apparatus is further configured to send an instruction to a target camera based on the acoustic source direction, and unlock the vehicle based on received image data collected by the target camera. The target camera is configured to collect the image data according to the instruction sent by the vehicle unlocking apparatus, where the target camera is a camera that is installed on the vehicle and whose angle of view can ensure that the acoustic source direction is captured.

Optionally, the vehicle unlocking apparatus is further configured to select, based on the acoustic source direction and from a plurality of cameras installed on the vehicle, a camera whose angle of view can ensure that the acoustic source direction is captured, and determine the selected camera as the target camera.

Optionally, the step of unlocking, by the vehicle unlocking apparatus, the vehicle based on the received image data collected by the target camera is specifically:

matching the image data collected by the target camera with stored figure image data; and unlocking the vehicle if the image data collected by the target camera matches the stored figure image data.

Optionally, the stored figure image data includes a facial feature;

the step of matching, by the vehicle unlocking apparatus, the image data collected by the target camera with the stored figure image data is specifically:

extracting a facial feature of a figure recognized in the image data; and the step of unlocking, by the vehicle unlocking apparatus, the vehicle if the image data collected by the target camera matches the stored figure image data is specifically:

unlocking the vehicle if the facial feature of the figure recognized in the image data matches any stored facial feature.

Optionally, the image data collected by the target camera is a video, and the stored figure image data includes a gait feature;

the step of matching, by the vehicle unlocking apparatus, the image data collected by the target camera with the stored figure image data is specifically:

extracting a gait feature of a figure recognized in the video; and the step of unlocking, by the vehicle unlocking apparatus, the vehicle if the image data collected by the target camera matches the stored figure image data is specifically:

unlocking the vehicle if the gait feature of the figure recognized in the image data matches any stored gait feature.

According to a fourth aspect, a vehicle unlocking apparatus is provided. The apparatus includes a memory and a processor. The memory is configured to store a wakeup keyword, where the wakeup keyword is used to indicate that a vehicle currently needs to be unlocked. The processor is configured to obtain a voice signal, determine an acoustic source direction based on the voice signal if the voice signal includes the wakeup keyword, and indicate a target camera to collect image data, where the target camera is a camera that is installed on the vehicle and whose angle of view can ensure that the acoustic source direction is captured. The processor is further configured to unlock the vehicle based on the image data.

Optionally, the processor is further configured to select, based on the acoustic source direction and from a plurality of cameras installed on the vehicle, a camera whose angle of view can ensure that the acoustic source direction is captured, and determine the selected camera as the target camera.

Optionally, the step of unlocking, by the processor, the vehicle based on the received image data collected by the target camera is specifically:

matching the image data collected by the target camera with stored figure image data; and unlocking the vehicle if the image data collected by the target camera matches the stored figure image data.

According to a fifth aspect, a vehicle is provided, where the vehicle includes a memory, a processor, and at least one camera. The memory is configured to store a wakeup keyword, where the wakeup keyword is used to indicate that a vehicle currently needs to be unlocked. The processor is configured to obtain a voice signal, and determine an acoustic source direction based on the voice signal if the voice signal includes the wakeup keyword. The processor is further configured to select a target camera from the at least one camera based on the acoustic source direction, send an instruction to the target camera, and unlock the vehicle based on received image data collected by the target camera. The target camera is configured to collect the image data according to the instruction sent by the processor, where the target camera is a camera that is installed on the vehicle and whose angle of view can ensure that the acoustic source direction is captured.

Optionally, the processor is further configured to select, based on the acoustic source direction and from a plurality of cameras installed on the vehicle, a camera whose angle of view can ensure that the acoustic source direction is captured, and determine the selected camera as the target camera.

Optionally, the step of unlocking, by the processor, the vehicle based on the received image data collected by the target camera is specifically:

matching the image data collected by the target camera with stored figure image data; and unlocking the vehicle if the image data collected by the target camera matches the stored figure image data.

According to a sixth aspect, a computer readable storage medium is provided. The computer readable storage medium stores an instruction, and when the instruction is run on a computer, the computer is enabled to perform the vehicle unlocking method in the first aspect.

According to a seventh aspect, a computer program product including an instruction is provided. When the instruction is run on a computer, the computer is enabled to perform the vehicle unlocking method in the first aspect.

Technical effects obtained in the second aspect, the third aspect, the fourth aspect, the fifth aspect, the sixth aspect, and the seventh aspect are similar to the technical effects obtained by using the technical means corresponding to the first aspect, and details are not described herein again.

The technical solutions provided in this application include at least the following beneficial effects:

In this application, first, the wakeup keyword detection is performed on the obtained voice signal. If the voice signal includes the wakeup keyword, in other words, the wakeup keyword detection succeeds, the acoustic source direction is determined, and the target camera is indicated to collect the image data. The target camera is a camera that is installed on the vehicle and whose angle of view can ensure that the acoustic source direction is captured. Then, the vehicle is unlocked based on the image data collected by the target camera. Compared with a method in which a user manually enters a password in a related technology, a process of performing the wakeup keyword detection on the voice signal and unlocking the vehicle based on the image data in this solution takes a relatively short time, in other words, a vehicle unlocking speed in this solution is relatively high. In addition, in this solution, the vehicle is unlocked based on the wakeup keyword and the image data, and the vehicle cannot be unlocked if there is no wakeup keyword or the image data does not match the stored figure image data. Therefore, security of this solution is relatively high.

BRIEF DESCRIPTION OF DRAWINGS

FIG. 3 is a schematic structural diagram of a vehicle according to another example embodiment of this application;

FIG. 4 is a flowchart of a vehicle unlocking method according to an example embodiment of this application;

DESCRIPTION OF EMBODIMENTS

To make the objectives, technical solutions, and advantages of this application clearer, the following further describes the implementations of this application in detail with reference to the accompanying drawings.

Figure 1:
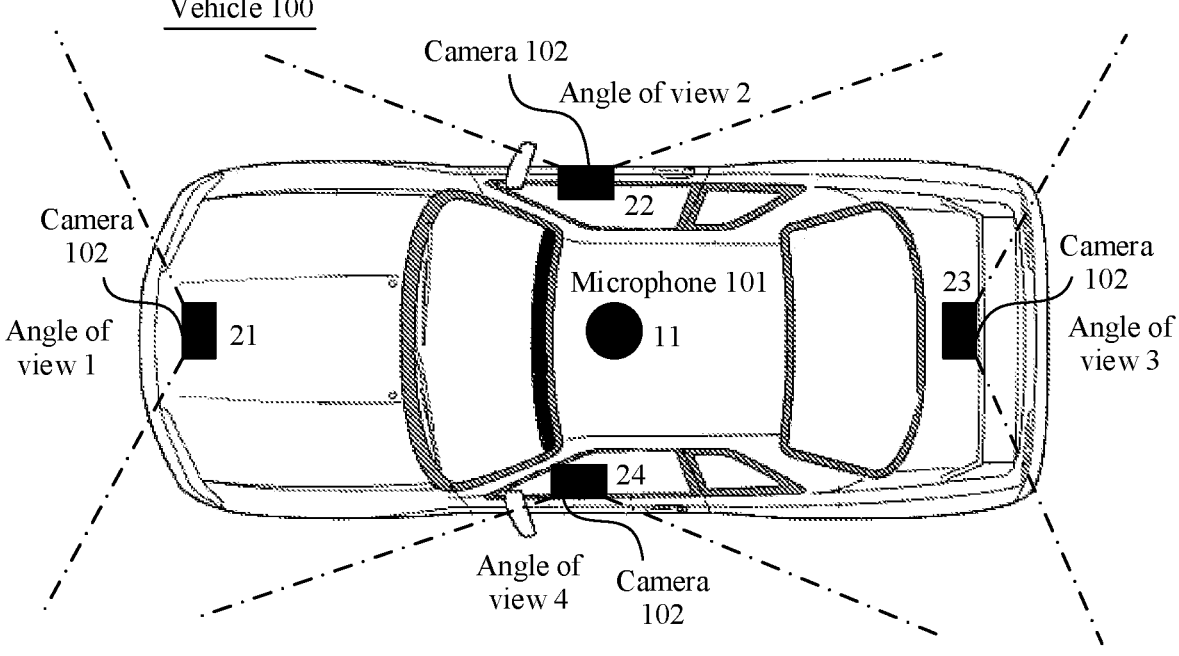
FIG. 1 is a schematic structural diagram of a vehicle according to an example embodiment of this application.

FIG. 1 is a schematic structural diagram of vehicle 100 according to an embodiment of this application. Referring to FIG. 1, a microphone 101 and a plurality of cameras 102 are installed on the vehicle 100, and the vehicle further includes an in-vehicle infotainment 103 (not shown), also be referred to as a vehicle unlocking apparatus. The microphone 101 may be in a communication connection to the in-vehicle infotainment 103, and each camera 102 may be in a communication connection to the in-vehicle infotainment 103. In some embodiments, the microphone 101 may be further in a communication connection to each camera 102.

The microphone 101 may be installed at a middle position outside a roof of the vehicle 100, for example, a position 11 in FIG. 1, or may be installed at another position outside a vehicle body. The cameras 102 may be installed at different positions outside the vehicle body, each camera 102 corresponds to one angle of view, and a sum of angles of view of the cameras 102 is not less than 360 degrees. Referring to FIG. 1, it is assumed that four cameras 102 are installed. The four cameras 102 may be respectively located at a position 21, a position 22, a position 23, and a position 24 in the figure. An angle of view of each camera may be shown by dashed lines in FIG. 1. The angles of view of the cameras 102 may be the same or different, and each angle of view may be 120 degrees, 160 degrees, or the like. Each camera 102 may be a wide angle camera, an infrared camera, a binocular camera, or the like. A camera of a corresponding type may be installed on the vehicle according to an actual application.

The microphone 101 is a low power consumption apparatus, may be in a working state in real time, and is configured to collect a voice signal in an environment, and send the collected voice signal to the in-vehicle infotainment 103 for voice processing, including wakeup keyword detection, acoustic source localization, and the like. In some other embodiments, the voice processing may further include voiceprint matching.

The microphone 101 may be a microphone array including a plurality of microphones, for example, a microphone array including four, six, or eight microphones, and each microphone may be an omnidirectional microphone. For example, referring to FIG. 2, the microphone 101 is a planar microphone array including eight microphones, and the eight microphones may be evenly distributed on a 360-degree ring on a plane.

The in-vehicle infotainment 103 is configured to receive the voice signal sent by the microphone 101, and after detecting a wakeup keyword and determining an acoustic source direction, control the target camera 102 to be turned on, in other words, wake up the target camera 102. The target camera 102 is a camera that is installed on the vehicle 100 and whose angle of view can ensure that the acoustic source direction is captured.

The camera 102 is a high power consumption apparatus. When the target camera 102 is not woken up, each camera 102 is in an off state. After the target camera 102 is woken up, the target camera 102 is in a working state, and the other cameras 102 are still in the off state. The target camera 102 may collect image data in an angle of view of the target camera 102, and send the collected image data to the in-vehicle infotainment 103, and then the target camera 102 may be turned off according to control of the in-vehicle infotainment 103.

The in-vehicle infotainment 103 is further configured to receive the image data collected by the target camera 102, and control, based on the collected image data, the vehicle 100 to be unlocked.

In some other embodiments, only one camera 102 may be installed on the vehicle 100, and the camera 102 may be installed at a middle position outside the roof of the vehicle. In this way, the camera 102 may be used as the target camera 102. After determining the acoustic source direction, the in-vehicle infotainment 103 may control the target camera 102 to rotate to adjust an angle, so that an angle of view of the target camera 102 can ensure that the acoustic source direction is captured.

In some embodiments, the in-vehicle infotainment 103 in FIG. 1 may include a processor 302, a controller 303, and a memory 304 in FIG. 3.

In other words, referring to FIG. 3, a vehicle 300 may include a sensor module 301, the processor 302, the controller 303, and the memory 304. The sensor module 301 may include a microphone 3011 and a plurality of cameras 3012, and the processor 302 may include a voice processing unit 3021 and an image processing unit 3022, and the vehicle body controller 303 may include a camera control unit 3031 and a vehicle lock control unit 3032.

The microphone 3011 and the plurality of cameras 3012 that are included in the sensor module 301 are respectively configured to collect a voice signal and image data. The microphone 3011 may be a microphone array including a plurality of microphones, and each camera 3012 may be a single camera, a binocular camera, an infrared camera, a wide angle camera, or the like.

The voice processing unit 3021 and the image processing unit 3022 that are included in the processor 302 are respectively configured to process the collected voice signal and image data. The processor 302 may be a general purpose central processing unit (CPU), a network processor (NP), a microprocessor, or one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The camera control unit 3031 and the vehicle lock control unit 3032 that are included in the controller 303 are respectively configured to control each camera 3012 to be turned on or turned off and control the vehicle to be unlocked.

Optionally, the controller 303 may be included in the in-vehicle infotainment 103. In other words, the in-vehicle infotainment 103 may include the controller 303, or the in-vehicle infotainment 103 does not include the controller 303. If the in-vehicle infotainment 103 includes the controller 303, after processing the voice signal or the image data, the processor 302 may send indication information to the controller 303, and the controller 303 controls, according to the indication information, the camera 3012 to be turned on or off, or controls the vehicle to be unlocked. If the in-vehicle infotainment 103 does not include the controller 303, after processing the voice signal or the image data, the processor 302 may indicate the camera 3012 to be turned on or off or control the vehicle to be unlocked.

The memory 304 is configured to store data, program code, and the like in the embodiments of this application. The memory 304 may be a read-only memory (ROM), or may be a random access memory (RAM), or may be an electrically erasable programmable read-only memory (EE-PROM), or an optical disc (including a compact disc read-only memory (CD-ROM), a compact disc, a laser disc, a digital versatile disc, a Blu-ray disc, or the like), a magnetic storage medium or another magnetic storage device, or any other medium that can carry or store expected program code in a form of an instruction or a data structure and that can be accessed by a computer, but is not limited thereto.

The vehicle 300 further includes a communications bus and a communications interface, and the communications bus is configured to transmit information between the foregoing components. The communications bus may be classified into an address bus, a data bus, a control bus, and the like. The communications interface uses any apparatus such as a transceiver, and is configured to communicate with another device or a communications network. The communications interface includes a wired communications interface, and may further include a wireless communications interface. The wired communications interface, for example, may be an Ethernet interface. The Ethernet interface may be an optical interface, an electrical interface, or a combination thereof. The wireless communications interface may be a wireless local area network (wireless local area networks, WLANs) interface, a cellular network communications interface, or a combination thereof. The memory 304 may exist independently, and is connected to the processor 302 by using the communications bus, or the memory 304 may be integrated with the processor 302.

In some embodiments, the vehicle 300 may include a plurality of processors, and each of these processors may be a single-core processor, or may be a multi-core processor. The processor may be one or more devices, circuits, and/or processing cores used to process data (for example, a computer program instruction).

In some embodiments, the memory 304 is configured to store program code for performing the solutions in this application, and the processor 302 may execute the program code stored in the memory 203. The program code may include one or more software modules. The vehicle may implement, by using the processor 302, the controller 303, and the program code in the memory 304, a vehicle unlocking method provided in the following embodiment in FIG. 4.

FIG. 4 is a flowchart of a vehicle unlocking method according to an embodiment of this application. An example in which the method is applied to the in-vehicle infotainment 103 in FIG. 1 is used for description. Referring to FIG. 4, the method includes the following steps.

Step 401: Obtain a voice signal.

In this embodiment of this application, a microphone is installed on a vehicle, and the microphone may collect a voice signal in an environment, and transmit the collected voice signal to the in-vehicle infotainment.

It should be noted that the microphone is a low power consumption apparatus.

Therefore, the microphone may be in a working state at all times, to collect the voice signal in the environment in real time.

Step 402: Determine an acoustic source direction based on the voice signal if the voice signal includes a wakeup keyword.

In this embodiment of this application, after the voice signal is obtained, wakeup keyword detection may be performed on the voice signal, where the wakeup keyword is used to indicate that the vehicle currently needs to be unlocked. If it is detected that the voice signal includes the wakeup keyword, it may be determined that the wakeup keyword detection succeeds.

The wakeup keyword is set based on a user voice. After obtaining a user voice used to set the wakeup keyword, the in-vehicle infotainment processes the user voice to obtain a spectrogram or text information of the user voice, and stores the spectrogram or the text information for the wakeup keyword detection. After receiving the voice signal in the environment, the microphone may send the voice signal to the in-vehicle infotainment. The in-vehicle infotainment may process the voice signal to obtain a spectrogram or text information of the voice signal. If the spectrogram of the voice signal matches the spectrogram of the wakeup keyword, it may be determined that the voice signal includes the wakeup keyword, or if the text information of the voice signal includes the wakeup keyword, it may be determined that the voice signal includes the wakeup keyword.

For example, it is assumed that the wakeup keyword is set based on a user voice "Xiaoyi Xiaoyi" made by a user, the wakeup keyword is "Xiaoyi Xiaoyi", and the in-vehicle infotainment stores a spectrogram of the wakeup keyword. If the user says "Xiaoyi Xiaoyi" outside the vehicle, and a spectrogram that is of the voice signal and that is obtained after the in-vehicle infotainment processes the obtained voice signal matches the spectrogram of the wakeup keyword, it may be determined that the voice signal includes the wakeup keyword.

It can be learned from the foregoing that the microphone may be a microphone array including a plurality of microphones, to collect a plurality of voice signals. After collecting the plurality of voice signals, the microphone may send the collected plurality of voice signals to the in-vehicle infotainment. The in-vehicle infotainment may process the received plurality of voice signals according to a beamforming algorithm, to form a beam signal having a highest signal-to-noise ratio, or obtain a plurality of beam signals whose signal-to-noise ratios are greater than a signal-to-noise ratio threshold.

For example, it is assumed that currently, only one person speaks loudly outside the vehicle. Then, after the microphone collects a plurality of voice signals and sends the plurality of voice signals to the in-vehicle infotainment, the in-vehicle infotainment may process the plurality of voice signals according to the beamforming algorithm, to obtain a beam signal having a highest signal-to-noise ratio. It is assumed that currently, a plurality of people speak loudly outside the vehicle. Then, more than one beam signal whose signal-to-noise ratios are greater than the signal-to-noise ratio threshold may be finally determined.

After obtaining the one or more beam signals according to the beamforming algorithm, the in-vehicle infotainment may process the one or more beam signals to perform the wakeup keyword detection. For example, the in-vehicle infotainment may process the one or more beam signals to obtain a spectrogram of each beam signal. If there is a beam signal whose spectrogram matches the spectrogram of the wakeup keyword, it may be determined that the obtained voice signal includes the wakeup keyword. Alternatively, the in-vehicle infotainment may perform speech recognition on the one or more beam signals to obtain text information of each beam signal. If there is a beam signal whose text information includes the wakeup keyword, it may be determined that the obtained voice signal includes the wakeup keyword.

After determining that the obtained voice signal includes the wakeup keyword, the in-vehicle infotainment may further perform acoustic source localization according to the beamforming algorithm, to determine the acoustic source direction, that is, determine an acoustic source direction corresponding to the beam signal including the wakeup keyword. A principle of performing the acoustic source localization according to the beamforming algorithm is: For a same acoustic source, phases of the plurality of voice signals collected by the plurality of microphones may be different. Delay estimation may be performed based on the phases corresponding to the plurality of voice signals, and then, the acoustic source localization is performed based on a delay error, to determine the acoustic source direction.

Figure 2:
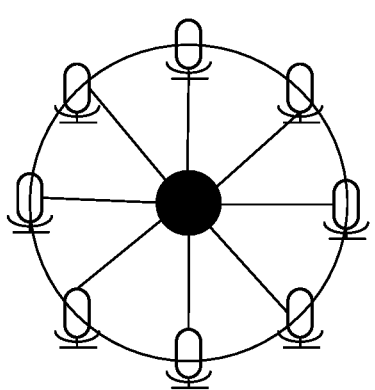
FIG. 2 is a schematic structural diagram of a microphone according to an example embodiment of this application.

For example, the microphone in FIG. 2 is still used as an example. The microphone is a planar microphone array including eight microphones. The eight microphones may be evenly distributed on a 360-degree ring horizontally. Each microphone collects one voice signal, and the eight microphones may collect eight voice signals. The microphone may send the collected eight voice signals to the in-vehicle infotainment. The in-vehicle infotainment may obtain one or more beam signals according to the beamforming algorithm, and perform the wakeup keyword detection on each beam signal. After determining that there is a beam signal including the wakeup keyword, the in-vehicle infotainment may further perform the acoustic source localization according to the beamforming algorithm, to determine an acoustic source direction of the beam signal including the wakeup keyword.

Optionally, in this embodiment of this application, to further improve security, after the wakeup keyword detection is performed on the obtained voice signal, voiceprint feature matching may be further performed, and after the voiceprint feature matching succeeds, the acoustic source direction is determined. To be specific, if the voice signal includes the wakeup keyword, a voiceprint feature in the voice signal is extracted, and if the extracted voiceprint feature matches any stored voiceprint feature, the acoustic source direction is determined based on the voice signal.

In this embodiment of this application, the in-vehicle infotainment stores a voiceprint feature of a figure. After determining that the obtained voice signal includes the wakeup keyword, the in-vehicle infotainment may extract the voiceprint feature in the voice signal, and may further determine the acoustic source direction based on the voice signal if the extracted voiceprint feature matches any stored voiceprint feature.

For example, after obtaining the one or more beam signals according to the beamforming algorithm, and determining the beam signal including the wakeup keyword, the in-vehicle infotainment may extract a voiceprint feature in the beam signal, and if the extracted voiceprint feature matches any stored voiceprint feature, the in-vehicle infotainment may further determine, according to the beamforming algorithm, the acoustic source direction of the beam signal including the wakeup keyword.

It should be noted that in this embodiment of this application, the in-vehicle infotainment may store voiceprint features of one or more figures. If the stored voiceprint feature includes a voiceprint feature that matches the extracted voiceprint feature of the voice signal, the in-vehicle infotainment may determine that the voiceprint feature matching succeeds. In addition, the in-vehicle infotainment may further store a spectrogram or text information of one or more wakeup keywords. If the obtained voice signal includes any one of the one or more wakeup keywords, the in-vehicle infotainment may determine that the wakeup keyword detection succeeds.

In some other embodiments, after obtaining the voice signal, the in-vehicle infotainment may first perform the wakeup keyword detection, then determine the acoustic source direction, and then perform the voiceprint feature matching.

Step 403: Indicate, based on the acoustic source direction, a target camera to collect image data.

In this embodiment of this application, after determining the acoustic source direction, the in-vehicle infotainment may control the target camera to be turned on to collect the image data. The target camera is a camera that is installed on the vehicle and whose angle of view can ensure that the acoustic source direction is captured.

In a possible case, a plurality of cameras are installed on the vehicle. The in-vehicle infotainment may select, based on the acoustic source direction and from the plurality of cameras installed on the vehicle, a camera whose angle of view can ensure that the acoustic source direction is captured, determine the selected camera as the target camera, and indicate, based on the acoustic source direction, the target camera to collect the image data.

In this embodiment of this application, each of the plurality of cameras installed on the vehicle may correspond to one angle of view, each angle of view is a part of 360 degrees on a plane, and the acoustic source direction may be an angle value. For example, it is assumed that the acoustic source direction is 50 degrees, and an angle of view of one of the plurality of cameras is 0 degrees to 160 degrees. Then, the camera may be determined as the target camera, and the target camera is turned on to collect image data.

Optionally, after determining the target camera, the in-vehicle infotainment may further control the target camera to rotate to adjust an angle, so that a middle position of the angle of view of the target camera overlaps the acoustic source direction, and the target camera captures a complete figure image as far as possible.

It should be noted that in this embodiment of this application, there may be an overlapping part between the plurality of angles of view of the plurality of cameras. If the acoustic source direction is located on an overlapping part between angles of view of two cameras, the in-vehicle infotainment may control both of the two cameras to be turned on as target cameras.

In some other possible cases, only one camera may be installed on the vehicle, and the camera may be installed at a middle position outside a roof of the vehicle. In this way, the camera is the target camera. After determining the acoustic source direction, the in-vehicle infotainment may control the target camera to rotate to adjust an angle, so that the angle of view of the target camera can ensure that the acoustic source direction is captured. For example, the middle position of the angle of view of the target camera may be enabled to overlap the acoustic source direction, and then the in-vehicle infotainment may indicate the target camera to collect the image data.

After the target camera is turned on to collect the image data, the target camera may send the collected image data to the in-vehicle infotainment, and the in-vehicle infotainment may process the received image data, to determine whether to unlock the vehicle.

Step 404: Unlock the vehicle based on the image data collected by the target camera.

In this embodiment of this application, the in-vehicle infotainment may store figure image data, and the in-vehicle infotainment may perform image processing on the image data collected by the target camera, to unlock the vehicle based on an image processing result.

Optionally, a process of performing, by the in-vehicle infotainment, the image processing may be: matching the image data collected by the target camera with the stored figure image data, and then unlocking the vehicle if the image data collected by the target camera matches the stored figure image data.

In this embodiment of this application, the image processing may be facial recognition, gait recognition, iris recognition, or the like, and correspondingly, the figure image data stored in the in-vehicle infotainment may include a facial feature, a gait feature, an iris feature, or the like. If image data matching is performed based on facial recognition or an iris feature, the image data collected by the target camera may be an image or a video. If image data matching is performed based on a gait feature, the image data collected by the target camera may be a video. In other words, in this embodiment of this application, there may be a plurality of implementations of performing, by the in-vehicle infotainment, the image data matching. The following describes two implementations.

In a first implementation, the figure image data stored in the in-vehicle infotainment includes a facial feature, and the in-vehicle infotainment performs the image data matching based on facial recognition.

It can be learned from the foregoing that the image data collected by the target camera may be an image or a video. In this implementation, after collecting the image data by using the target camera, the in-vehicle infotainment may extract a facial feature of a figure recognized in the image data, and unlock the vehicle if the facial feature of the figure recognized in the image data matches any stored facial feature.

It should be noted that if the image data collected by the target camera is an image, there may be one or more images, or if the image data collected by the target camera is a video, the video may include a plurality of frames of images.

In this embodiment of this application, the in-vehicle infotainment stores the facial feature. After obtaining the image data collected by the target camera, the in-vehicle infotainment may recognize the face of the figure in the image data by using a facial recognition technology, and after recognizing the face, extract the facial feature of the figure recognized in the image data. If the extracted facial feature of any figure matches any stored facial feature, it may be determined that the facial recognition succeeds, and the vehicle is unlocked.

For example, the facial feature may be a geometric feature, for example, a five-sense feature or a five-sense feature and a distance feature between the five senses. One or more figures may be recognized, and a facial feature of each recognized figure is extracted. If a similarity between an extracted facial feature of a figure and any stored facial feature exceeds a face similarity threshold, the in-vehicle infotainment may determine that facial feature matching succeeds, and further control the vehicle to be unlocked.

If image processing is performed on each region of an entire image, a relatively large amount of data needs to be processed. The acoustic source direction has been determined above, and a time interval from when the acoustic source direction is determined to when the image data is collected is very short. Based on this, after obtaining the image data collected by the target camera, the in-vehicle infotainment may alternatively extract a facial feature of a figure that is recognized in the image data and that is located in the acoustic source direction, and unlock the vehicle if the extracted facial feature matches any stored facial feature. To be specific, the in-vehicle infotainment may perform the facial recognition in a small range based on the acoustic source direction, to greatly reduce a computing amount of image processing and further increase an unlocking speed.

In this embodiment of this application, on the basis that the acoustic source direction is determined, the in-vehicle infotainment may determine an image region from the collected image data based on the acoustic source direction, and extract a facial feature of a figure recognized in the image region.

An implementation of determining the image region from the collected image data based on the acoustic source direction may be: determining a relative position of the acoustic source direction in the angle of view of the target camera; determining a reference position on the image data based on the relative position; and extending the reference position on the image data to each of a left side and a right side by a reference neighborhood range, to obtain the image region.

Figure 5:
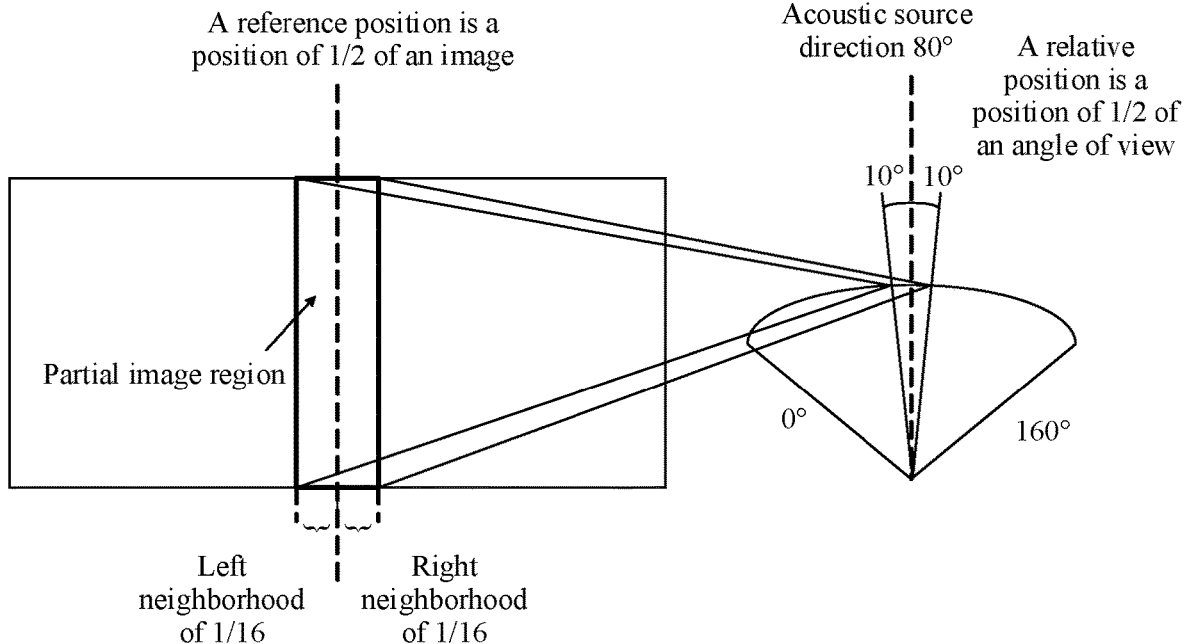
FIG. 5 is a schematic diagram of a method for determining an image region according to an example embodiment of this application.

For example, referring to FIG. 5, it is assumed that the angle of view of the target camera is a sector range of 0 degrees to 160 degrees in the figure, the left is 0 degrees, the right is 160 degrees, the acoustic source direction is 80 degrees, a width of an image is 16 centimeters, and the reference neighborhood range is $\frac{1}{16}$ of the entire width of the image, namely, one centimeter. Then, it may be determined that the acoustic source direction is located at a position of $\frac{1}{2}$ of the angle of view, that is, the relative position is $\frac{1}{2}$ of the angle of view. Based on the relative position, it may be determined that the reference position is a position of $\frac{1}{2}$ of the image, and image data obtained by extending the position of $\frac{1}{2}$ of the image to each of a left side and a right side by $\frac{1}{16}$ of the width of the image, namely, by one centimeter, is determined as the image region. In other words, a corresponding image region obtained by extending the acoustic source direction, namely, 80 degrees, to each of the left side and the right side by 10 degrees is the image region.

In a second implementation, the figure image data stored in the in-vehicle infotainment includes a gait feature, and the in-vehicle infotainment performs the image data matching based on gait recognition.

It can be learned from the foregoing that the image data collected by the target camera may be a video. In this implementation, after receiving the image data collected by the target camera, the in-vehicle infotainment may extract a gait feature of a figure recognized in the video, and unlock the vehicle if the gait feature of the figure recognized in the image data matches any stored gait feature.

In this embodiment of this application, the in-vehicle infotainment stores a gait feature of a user. After obtaining the video collected by the target camera, the in-vehicle infotainment may extract a gait feature of each figure in the video based on a gait recognition technology, and if the extracted gait feature of any figure matches any stored gait feature, determine that the gait recognition succeeds, and unlock the vehicle.

Optionally, the image data collected by the target camera is a video. After collecting the image data by using the target camera, first, the in-vehicle infotainment may alternatively extract a facial feature of a figure recognized in the video, and determine, as a target figure, a recognized figure whose facial feature matches any stored facial feature. Then, the in-vehicle infotainment extracts a gait feature of the target figure recognized in the video, and unlocks the vehicle if the gait feature of the target figure matches any stored gait feature.

In this embodiment of this application, if gait recognition is performed on all image data of the collected video, a relatively large amount of data needs to be processed. Therefore, the in-vehicle infotainment may perform facial recognition on the collected video, to obtain a figure matching any stored facial feature, further track the figure, and perform gait recognition only on the figure in the video. A process of performing the facial recognition on the collected image data may be: processing image data of an entire image, or processing image data in a small range based on the acoustic source direction. For a related implementation, refer to the foregoing related descriptions, and details are not described herein again.

It should be noted that if a similarity between an extracted gait feature of a figure and any stored gait feature exceeds a gait similarity threshold, the in-vehicle infotainment may determine that gait feature matching succeeds, and further control the vehicle to be unlocked. Alternatively, if a similarity between the extracted gait feature of the target figure and any stored gait feature exceeds a gait similarity threshold, the in-vehicle infotainment may determine that gait feature matching succeeds.

In some embodiments, the target camera may continuously collect a plurality of frames of images after being turned on. In a collection process, each collected frame of image is sent to the in-vehicle infotainment in real time. The in-vehicle infotainment may perform facial recognition and facial feature matching on each received frame of image in real time, or generate a video stream based on the received plurality of frames of images, recognize a figure in the video in real time, and extract a gait feature of each recognized figure or a recognized target figure in real time. After the facial feature matching or the gait feature matching succeeds, the in-vehicle infotainment may control the vehicle to be unlocked.

After the image data is collected by using the target camera, if the image data collected by the target camera does not match the stored user image data, the in-vehicle infotainment may turn off the target camera, to reduce power consumption, or the in-vehicle infotainment may further control, based on a voice of a figure, the target camera to remain in an on or off state, or if no figure is recognized in a time period, the in-vehicle infotainment may control the target camera to be turned off.

In this embodiment of this application, if the image data, for example, an image or a video, collected by the target camera does not match the stored figure image data, for example, facial recognition fails, gait recognition fails, iris recognition fails, no face is recognized, no gait is recognized, or no iris is recognized, the in-vehicle infotainment may control the camera to be turned off, to reduce power consumption.

Figure 6:
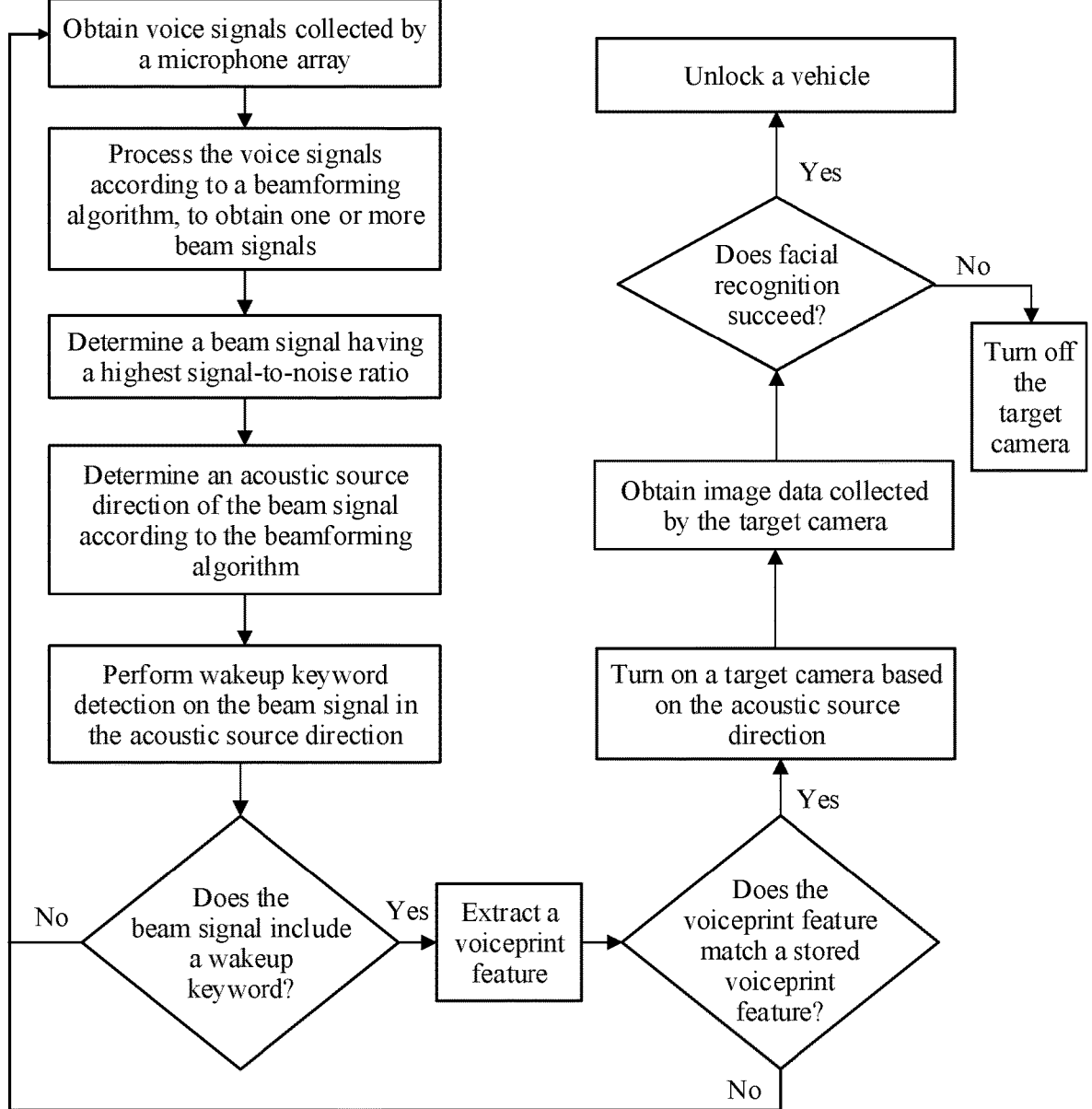
FIG. 6 is a flowchart of a vehicle unlocking method according to another example embodiment of this application.

FIG. 6 is a flowchart of another vehicle unlocking method according to an embodiment of this application. It is assumed that a plurality of cameras are installed on a vehicle. Referring to FIG. 6, a microphone array installed on the vehicle collects voice signals in real time and sends the voice signal to an in-vehicle infotainment. The in-vehicle infotainment obtains one or more beam signals according to a beamforming algorithm, determines a beam signal having a highest signal-to-noise ratio, determines an acoustic source direction of the beam signal according to the beamforming algorithm, and performs wakeup keyword detection on the beam signal. If no wakeup keyword is detected, the in-vehicle infotainment continues to obtain a collected voice signal, or if a wakeup keyword is detected, extracts a voiceprint feature of the beam signal, and performs voiceprint feature matching. If the voiceprint feature does not match a stored voiceprint feature, the in-vehicle infotainment continues to obtain a collected voice signal. If the voiceprint feature matches the stored voiceprint feature, the in-vehicle infotainment controls a target camera corresponding to the acoustic source direction to be turned off, to collect image data. The target camera sends the collected image data to the in-vehicle infotainment, and the in-vehicle infotainment extracts a facial feature in the collected image data, and unlocks the vehicle if facial feature matching succeeds, or turns off the target camera if facial feature matching fails.

It should be noted that when the image data does not match stored figure image data in preset duration, the in-vehicle infotainment may control the target camera to be turned off.

To sum up, in this embodiment of this application, first, the wakeup keyword detection is performed on the obtained voice signal. If the voice signal includes the wakeup keyword, in other words, the wakeup keyword detection succeeds, the acoustic source direction is determined, and the target camera is indicated to collect the image data. The target camera is a target camera that is installed on the vehicle and whose angle of view can ensure that the acoustic source direction is captured. Then, the vehicle is unlocked based on the image data collected by the target camera. Compared with a method in which a user manually enters a password in a related technology, a process of performing the wakeup keyword detection on the voice signal and unlocking the vehicle based on the image data in this solution takes a relatively short time, in other words, a vehicle unlocking speed in this solution is relatively high. In addition, in this solution, the vehicle is unlocked based on the wakeup keyword and the image data, and the vehicle cannot be unlocked if there is no wakeup keyword or the image data does not match the stored figure image data. Therefore, security of this solution is relatively high.

Figure 7:
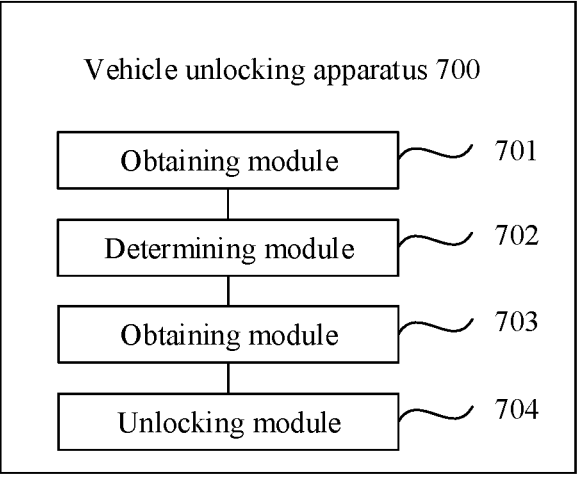
FIG. 7 is a schematic structural diagram of a vehicle unlocking apparatus according to an example embodiment of this application.

FIG. 7 is a schematic structural diagram of a vehicle unlocking apparatus according to an embodiment of this application. The vehicle unlocking apparatus 700 may be implemented as a part or all of a vehicle by using software, hardware, or a combination of software and hardware, and the vehicle may be the vehicle in FIG. 1. Referring to FIG. 7, the apparatus 700 includes an obtaining module 701, a determining module 702, an indication module 703, and an unlocking module 704.

The obtaining module 701 is configured to obtain a voice signal.

The determining module 702 is configured to determine an acoustic source direction based on the voice signal if the voice signal includes a wakeup keyword, where the wakeup keyword is used to indicate that a vehicle currently needs to be unlocked.

The indication module 703 is configured to indicate, based on the acoustic source direction, a target camera to collect image data, where the target camera is a camera that is installed on the vehicle and whose angle of view can ensure that the acoustic source direction is captured.

The unlocking module 704 is configured to unlock the vehicle based on the image data collected by the target camera.

Optionally, the indication module 703 includes:

a first determining unit, configured to select, based on the acoustic source direction and from a plurality of cameras installed on the vehicle, a camera whose angle of view can ensure that the acoustic source direction is captured, and determine the selected camera as the target camera; and a first indication unit, configured to indicate, based on the acoustic source direction, the target camera to collect the image data.

Optionally, the unlocking module 704 includes:

a matching unit, configured to match the image data collected by the target camera with stored figure image data; and an unlocking unit, configured to unlock the vehicle if the image data collected by the target camera matches the stored figure image data.

Optionally, the stored figure image data includes a facial feature;

the matching unit is specifically configured to:

a first extraction subunit, configured to extract a facial feature of a figure recognized in the image data; and the unlocking unit includes:

a first unlocking subunit, configured to unlock the vehicle if the facial feature of the figure recognized in the image data matches any stored facial feature.

Optionally, the stored figure image data includes a facial feature;

the first extraction subunit is further configured to:

extract a facial feature of a figure that is recognized in the image data and that is located in the acoustic source direction; and the first unlocking subunit is further configured to:

unlock the vehicle if the extracted facial feature matches any stored facial feature.

Optionally, the first extraction subunit is specifically configured to:

determine an image region from the image data based on the acoustic source direction; and extract a facial feature of a figure recognized in the image region.

Optionally, the first extraction subunit is further specifically configured to:

determine a relative position of the acoustic source direction in the angle of view of the target camera;

determine a reference position on the image data based on the relative position; and extend the reference position on the image data to each of a left side and a right side by a reference neighborhood range, to obtain the image region Optionally, the image data collected by the target camera is a video, and the stored figure image data includes a gait feature;

the matching unit includes:

a second extraction subunit, configured to extract a gait feature of a figure recognized in the video; and the unlocking unit includes:

a second unlocking subunit, configured to unlock the vehicle if the gait feature of the figure recognized in the image data matches any stored gait feature.

Optionally, the image data collected by the target camera is a video, and the stored figure image data includes a gait feature;

the second extraction subunit is specifically configured to:

extract a facial feature of a figure recognized in the image data;

determine, as a target figure, a recognized figure whose facial feature matches any stored facial feature; and extract a gait feature of the target figure recognized in the image data; and the second unlocking subunit is specifically configured to:

unlock the vehicle if the gait feature of the target figure matches any stored gait feature.

Optionally, the determining module includes:

an extraction unit, configured to: if the voice signal includes the wakeup keyword, extract a voiceprint feature in the voice signal; and a second determining unit, configured to: if the extracted voiceprint feature matches any stored voiceprint feature, determine the acoustic source direction based on the voice signal.

Optionally, the unlocking module 704 further includes:

a second indication unit, configured to indicate the target camera to be turned off if the image data collected by the target camera does not match the stored figure image data.

In this embodiment of this application, first, wakeup keyword detection is performed on the obtained voice signal. If the voice signal includes the wakeup keyword, in other words, the wakeup keyword detection succeeds, the acoustic source direction is determined, and the target camera is indicated to collect the image data. The target camera is a target camera that is installed on the vehicle and whose angle of view can ensure that the acoustic source direction is captured. Then, the vehicle is unlocked based on the image data collected by the target camera. Compared with a method in which a user manually enters a password in a related technology, a process of performing the wakeup keyword detection on the voice signal and unlocking the vehicle based on the image data in this solution takes a relatively short time, in other words, a vehicle unlocking speed in this solution is relatively high. In addition, in this solution, the vehicle is unlocked based on the wakeup keyword and the image data, and the vehicle cannot be unlocked if there is no wakeup keyword or the image data does not match the stored figure image data. Therefore, security of this solution is relatively high.

It should be noted that the vehicle unlocking apparatus provided in the foregoing embodiments is described only using division into the foregoing function modules. In practice, the functions may be allocated to different function modules for implementation as required. To be specific, an internal structure of an apparatus is divided into different function modules to implement all or some of the functions described above. In addition, the vehicle unlocking apparatus provided in the foregoing embodiments and the vehicle unlocking method embodiment belong to a same idea. For a specific implementation process, refer to the method embodiment, and details are not described herein again.

An embodiment of this application provides a vehicle unlocking system. The system includes a vehicle unlocking apparatus and at least one camera. The vehicle unlocking apparatus may be the in-vehicle infotainment in FIG. 1.

The vehicle unlocking apparatus may obtain a voice signal, and determine an acoustic source direction based on the voice signal if the voice signal includes a wakeup keyword, where the wakeup keyword is used to indicate that a vehicle currently needs to be unlocked. Then, the vehicle unlocking apparatus may send an instruction to a target camera based on the acoustic source direction, where the target camera is a camera that is in at least one camera installed on the vehicle and whose angle of view can ensure that the acoustic source direction is captured. The target camera may collect image data according to the instruction sent by the vehicle unlocking apparatus. Then, the vehicle unlocking apparatus may unlock the vehicle based on the received image data collected by the target camera.

An embodiment of this application provides a vehicle unlocking apparatus. The vehicle unlocking apparatus may be the in-vehicle infotainment in FIG. 1, and the apparatus includes a memory and a processor.

The memory stores a wakeup keyword, where the wakeup keyword is used to indicate that a vehicle currently needs to be unlocked.

The processor may obtain a voice signal, and determine an acoustic source direction based on the voice signal if the voice signal includes the wakeup keyword. Then, the processor may further indicate, based on the acoustic source direction, a target camera to collect image data, where the target camera is a camera that is installed on the vehicle and whose angle of view can ensure that the acoustic source direction is captured. The processor may further receive the image data collected by the target camera, and unlock the vehicle based on the image data.

An embodiment of this application provides a vehicle. The vehicle includes a memory, a processor, and at least one camera. The vehicle may be the vehicle in FIG. 1.

The memory stores a wakeup keyword, where the wakeup keyword is used to indicate that the vehicle currently needs to be unlocked.

The processor may obtain a voice signal, and if the voice signal includes the wakeup keyword, the processor may determine an acoustic source direction based on the voice signal. Then, the processor may further select a target camera from the at least one camera based on the acoustic source direction, and send an instruction to the target camera, where the target camera is a camera that is installed on the vehicle and whose angle of view can ensure that the acoustic source direction is captured. The target camera may collect image data according to the instruction sent by the controller. Then, the processor may further receive the image data collected by the target camera, and unlock the vehicle based on the image data.

It should be noted that the vehicle unlocking system, the vehicle unlocking apparatus, and the vehicle that are provided in the foregoing embodiments and the vehicle unlocking method embodiment belong to a same idea. For specific implementation processes, refer to the method embodiment, and details are not described herein again.

In addition, in the vehicle unlocking system, the vehicle unlocking apparatus, and the vehicle that are provided in the foregoing embodiments, first, wakeup keyword detection is performed on the obtained voice signal. If the voice signal includes the wakeup keyword, in other words, the wakeup keyword detection succeeds, the acoustic source direction is determined, and the target camera is indicated to collect the image data. The target camera is a target camera that is installed on the vehicle and whose angle of view can ensure that the acoustic source direction is captured. Then, the vehicle is unlocked based on the image data collected by the target camera. Compared with a method in which a user manually enters a password in a related technology, a process of performing the wakeup keyword detection on the voice signal and unlocking the vehicle based on the image data in this solution takes a relatively short time, in other words, a vehicle unlocking speed in this solution is relatively high. In addition, in this solution, the vehicle is unlocked based on the wakeup keyword and the image data, and the vehicle cannot be unlocked if there is no wakeup keyword or the image data does not match the stored figure image data. Therefore, security of this solution is relatively high.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like. It should be noted that the computer readable storage medium in this application may be a non-volatile storage medium, in other words, may be a non-transitory storage medium.

The foregoing descriptions are merely embodiments of this application, but are not intended to limit this application. Any modification, equivalent replacement, or improvement made without departing from the spirit and principle of this application should fall within the protection scope of this application.

A person of ordinary skill in the art may understand that all or some of the steps of the embodiments may be implemented by hardware or a program instructing related hardware. The program may be stored in a computer readable storage medium. The storage medium may include: a read-only memory, a magnetic disk, or an optical disc.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A vehicle unlocking method, wherein the vehicle unlocking method comprises:

obtaining a voice signal;

in response to determining that the voice signal comprises a wakeup keyword, extracting a voiceprint feature in the voice signal, wherein the wakeup keyword indicates that a vehicle needs to be unlocked;

in response to determining that the extracted voiceprint feature matches a stored voiceprint feature, determining an acoustic source direction based on the voice signal;

selecting, based on the acoustic source direction and from a plurality of cameras installed on the vehicle, a camera installed on the vehicle as a target camera to collect image data, wherein an angle of view of the target camera is configured to capture the acoustic source direction;

indicating, based on the acoustic source direction, the target camera to collect the image data; and unlocking the vehicle based on the image data collected by the target camera, wherein:

unlocking the vehicle based on the image data collected by the target camera comprises matching the image data collected by the target camera comprises matching the image data collected by the target camera with stored figure image data, wherein matching the image data collected by the target camera with stored figure image data comprises extracting a facial feature of a figure that is recognized in the image data and that is located in the acoustic source direction, wherein extracting the facial feature of a figure that is recognized in the image data and that is located in the acoustic source direction comprises determining an image region from the image data based on the acoustic source direction, and wherein determining the image region from the image data based on the acoustic source direction comprises:

determining a relative position of the acoustic source direction within the angle of view of the target camera;

determining a reference position on the image data based on the relative position; and extending the reference position on the image data to each of a left side and a right side by a reference neighborhood range to obtain the image region.

2. The vehicle unlocking method according to claim 1, wherein the unlocking the vehicle based on the image data collected by the target camera comprises:

unlocking the vehicle in response to determining that the image data collected by the target camera matches the stored figure image data.

3. The vehicle unlocking method according to claim 2, wherein:

the stored figure image data comprises a facial feature;

the unlocking the vehicle in response to determining that the image data collected by the target camera matches the stored figure image data comprises:

unlocking the vehicle in response to determining that the extracted facial feature matches any stored facial feature.

4. The vehicle unlocking method according to claim 3, wherein the extracting a facial feature of a figure that is recognized in the image data and that is located in the acoustic source direction further comprises: extracting a facial feature of a figure recognized in the image region.

5. The vehicle unlocking method according to claim 2, wherein:

the image data collected by the target camera is a video, and the stored figure image data comprises a gait feature;

the matching the image data collected by the target camera with stored figure image data comprises:

extracting a gait feature of a figure recognized in the video; and the unlocking the vehicle in response to determining that the image data collected by the target camera matches the stored figure image data comprises:

unlocking the vehicle in response to determining that the gait feature of the figure recognized in the image data matches any stored gait feature.

6. The vehicle unlocking method according to claim 2, wherein:

the image data collected by the target camera is a video, and the stored figure image data comprises a gait feature;

the matching the image data collected by the target camera with stored figure image data comprises:

extracting a facial feature of a figure recognized in the image data;

determining, as a target figure, a recognized figure whose facial feature matches any stored facial feature;

extracting a gait feature of the target figure recognized in the image data; and unlocking the vehicle if the gait feature of the target figure matches any stored gait feature.

7. A vehicle unlocking apparatus, wherein the vehicle unlocking apparatus comprises one or more memories and at least one processor, wherein:

the one or more memories are configured to store a wakeup keyword, wherein the wakeup keyword is used to indicate that a vehicle currently needs to be unlocked; and the one or more memories store program instructions for execution by the at least one processor to:

obtain a voice signal;

in in response to determining that the voice signal comprises a wakeup keyword, extract a voiceprint feature in the voice signal, wherein the wakeup keyword indicates that a vehicle needs to be unlocked;

in response to determining that the extracted voiceprint feature matches a stored voiceprint feature, determine an acoustic source direction based on the voice signal;

select, based on the acoustic source direction and from a plurality of cameras installed on the vehicle, a camera installed on the vehicle as a target camera to collect image data, wherein an angle of view of the target camera is configured to capture the acoustic source direction; and indicate, based on the acoustic source direction, the target camera to collect the image data; and unlock the vehicle based on the image data collected by the target camera, wherein:

unlocking the vehicle based on the image data collected by the target camera comprises matching the image data collected by the target camera comprises matching the image data collected by the target camera with stored figure image data, wherein matching the image data collected by the target camera with stored figure image data comprises extracting a facial feature of a figure that is recognized in the image data and that is located in the acoustic source direction, wherein extracting the facial feature of a figure that is recognized in the image data and that is located in the acoustic source direction comprises determining an image region from the image data based on the acoustic source direction, and wherein determining the image region from the image data based on the acoustic source direction comprises:

determining a relative position of the acoustic source direction within the angle of view of the target camera;

determining a reference position on the image data based on the relative position; and extending the reference position on the image data to each of a left side and a right side by a reference neighborhood range to obtain the image region.

8. The vehicle unlocking apparatus according to claim 7, wherein unlocking the vehicle based on the image data collected by the target camera comprises:

unlocking the vehicle in response to determining that the image data collected by the target camera matches the stored figure image data.

9. The vehicle unlocking apparatus according to claim 8, wherein:

the stored figure image data comprises a facial feature;

unlocking the vehicle in response to determining that the image data collected by the target camera matches the stored figure image data comprises:

unlocking the vehicle in response to determining that the extracted facial feature matches any stored facial feature.

10. The vehicle unlocking apparatus according to claim 9, wherein extracting the facial feature of the figure that is recognized in the image data and that is located in the acoustic source direction further comprises:

extracting a facial feature of a figure recognized in the image region.

11. A non-transitory computer-readable storage medium, wherein the non-transitory computer-readable storage medium stores program instructions for execution by at least one processor to:

obtain a voice signal;

in response to determining that the voice signal comprises a wakeup keyword, extract a voiceprint feature in the voice signal, wherein the wakeup keyword indicates that a vehicle needs to be unlocked;

in response to determining that the extracted voiceprint feature matches a stored voiceprint feature, determine an acoustic source direction based on the voice signal;

select, based on the acoustic source direction and from a plurality of cameras installed on the vehicle, a camera installed on the vehicle as a target camera to collect image data, wherein an angle of view of the target camera is configured to capture the acoustic source direction;

indicate, based on the acoustic source direction, the target camera to collect the image data; and unlock the vehicle based on the image data collected by the target camera wherein:

unlocking the vehicle based on the image data collected by the target camera comprises matching the image data collected by the target camera comprises matching the image data collected by the target camera with stored figure image data, wherein matching the image data collected by the target camera with stored figure image data comprises extracting a facial feature of a figure that is recognized in the image data and that is located in the acoustic source direction, wherein extracting the facial feature of a figure that is recognized in the image data and that is located in the acoustic source direction comprises determining an image region from the image data based on the acoustic source direction, and

wherein determining the image region from the image data based on the acoustic source direction comprises:

determining a relative position of the acoustic source direction within the angle of view of the target camera;

determining a reference position on the image data based on the relative position; and extending the reference position on the image data to each of a left side and a right side by a reference neighborhood range to obtain the image region.

12. The non-transitory computer-readable storage medium according to claim 11, wherein unlocking the vehicle based on the image data collected by the target camera comprises:

unlocking the vehicle in response to determining that the image data collected by the target camera matches the stored figure image data.

13. The non-transitory computer-readable storage medium according to claim 12, wherein:

the stored figure image data comprises a facial feature;

unlocking the vehicle in response to determining that the image data collected by the target camera matches the stored figure image data comprises:

unlocking the vehicle in response to determining that the facial feature of the figure recognized in the image data matches any stored facial feature.

14. The vehicle unlocking method according to claim 1, wherein determining that the voice signal comprises the wakeup keyword comprises:

determining that a spectrogram of the voice signal matches a spectrogram of the wakeup keyword.

15. The vehicle unlocking method according to claim 1, wherein determining that the voice signal comprises the wakeup keyword comprises:

determining that text information of the voice signal includes the wakeup keyword.

16. The vehicle unlocking apparatus according to claim 7, wherein the one or more memories store program instructions for execution by the at least one processor to:

determine that a spectrogram of the voice signal matches a spectrogram of the wakeup keyword.

17. The vehicle unlocking apparatus according to claim 7, wherein the one or more memories store program instructions for execution by the at least one processor to:

determine that text information of the voice signal includes the wakeup keyword.

18. The vehicle unlocking method according to claim 1, wherein the reference neighborhood range comprises a predetermined fraction of an entire width of an image of the image data.

19. The vehicle unlocking apparatus according to claim 7, wherein the reference neighborhood range comprises a predetermined fraction of an entire width of an image of the image data.

20. The non-transitory computer-readable storage medium according to claim 11, wherein the reference neighborhood range comprises a predetermined fraction of an entire width of an image of the image data.

* * * * *